Figure 1:
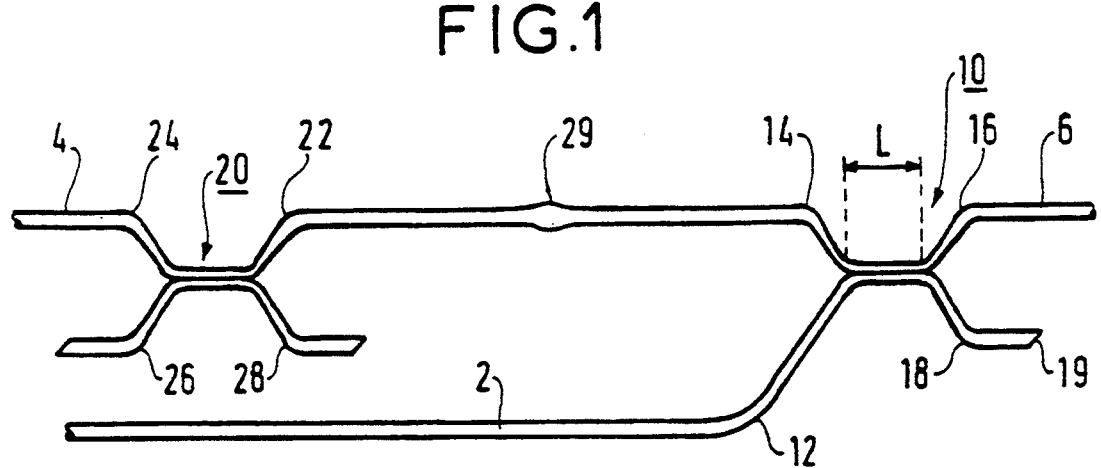

United States Patent
Bousselet

[11] Patent Number: 5,363,456
[45] Date of Patent: Nov. 8, 1994

[54] FREQUENCY SEPARATOR-AND-MIXER APPARATUS FOR GUIDED OPTICAL WAVES

[75] Inventor: Philippe Bousselet, Leudeville, France

[73] Assignee: Alcatel Alsthom Compagnie Generale d'Electricite, Paris Cedex, France

[21] Appl. No.: 39,327

[22] PCT Filed: Aug. 28, 1992

[86] PCT No.: PCT/FR92/00828

§ 371 Date: Apr. 4, 1993

§ 102(e) Date: Apr. 4, 1993

[87] PCT Pub. No.: WO93/05414

PCT Pub. Date: Mar. 18, 1993

[30] Foreign Application Priority Data

Aug. 30, 1991 [FR] France .................. 91 10788

[51] Int. Cl.$^5$ ............................................. G02B 6/26
[52] U.S. Cl. ............................................. 385/27; 385/24
[58] Field of Search ............... 372/6; 385/24, 15, 30, 385/46, 147, 27

[56] References Cited
U.S. PATENT DOCUMENTS 4,859,016 8/1989 Shaw et al. .................. 372/6
5,088,095 2/1992 Zirngibl .................. 372/6

OTHER PUBLICATIONS

Electronics Letters, vol. 26, No. 17, Aug. 16, 1990, Stevenage, GB, pp. 1397–1398, Y. Miyajima et al.: "Efficient 1.3 μ-Band Amplification in a Nd3+ -Doped Single-Mode Fluoride Fibre".
Components for Fiber Optic Applications V, 1990, SPIE, vol. 1365, SPIE, Bellingham, US, P. A. Nagy et al.: "Multiplexers for Optical Fiber Amplifiers".

Primary Examiner—Rodney B. Bovernick
Assistant Examiner—John Ngo
Attorney, Agent, or Firm—Sughrue, Mion, Zinn, Macpeak & Seas

[57] ABSTRACT

The apparatus includes a frequency-selective directing coupler (10) of the evanescent-wave type for injecting a low-frequency data-carrying wave and a high-frequency optical-pump wave that are guided by respective single-frequency waveguides (2, 4) into the same amplifying fiber (6). An isolation coupler (20) of the same type is inserted in series between the directing coupler (10) and at least one of the single-frequency waveguides (4) so as to transmit the corresponding wave selectively thereto. The invention applies in particular to making amplifiers for an optical-fiber transmission line.

3 Claims, 1 Drawing Sheet

FREQUENCY SEPARATOR-AND-MIXER APPARATUS FOR GUIDED OPTICAL WAVES

The present invention relates to mixing and/or separating optical waves having different frequencies and being guided by optical fibers. Such mixing and separation is often referred to as "multiplexing" and "demultiplexing", and the frequencies are referred to below as "low frequency" and "high frequency".

The invention applies more particularly to making long-distance data-transmission lines constituted by optical fibers. The invention then applies to mixing firstly a low-frequency data-carrying wave guided by an optical fiber which can be referred to as the "low-frequency waveguide" or the "low-frequency fiber", and secondly optical pump light constituting the high-frequency wave and guided by another optical fiber which can be referred to as the "high-frequency waveguide" or the "high-frequency fiber". The carrier wave and the pump light must be mixed in an amplifying fiber in order to amplify the carrier wave.

In which case, apparatus of the invention constitutes a mixer whose function is to perform the mixing, and which must therefore be matched as accurately as possible to the low frequency and to the high frequency. The apparatus must then also constitute a separator for the following reasons: firstly, a fraction of the carrier wave may be backscattered towards the apparatus by parts situated in the amplifying fiber or downstream therefrom. Since the apparatus is matched to the low frequency and to the high frequency, almost the entire fraction then leaves the apparatus towards the low-frequency fiber. However, if the apparatus is poorly matched to the low frequency and to the high frequency, a small fraction of the fraction leaves the apparatus towards the high-frequency fiber, and, when it leaves the high-frequency fiber, the small fraction can disturb the pump-light source. Furthermore, a portion of the pump light can also be backscattered. For similar reasons, it can pass through the apparatus not only towards the high-frequency fiber, but also towards the low-frequency fiber where it is unwanted. The apparatus must therefore constitute a separator whose function is to minimize both the fraction of the carrier wave that is returned into the high-frequency fiber, and also the fraction of the pump light that is returned into the low-frequency fiber. A quality of the separator constituted by the apparatus is therefore represented by an inter-port isolation coefficient which is the ratio of the intensity of the carrier wave that is returned into the high-frequency fiber, or the intensity of the pump light that is returned into the low-frequency fiber from the apparatus, divided respectively by the intensity of the carrier wave or of the pump light backscattered towards the apparatus. This coefficient is usually expressed in decibels, and the higher the coefficient, the higher the quality of the apparatus.

Another quality of the apparatus is represented by an insertion loss coefficient which is the ratio of the intensity of a wave or of a plurality of waves having the same frequency arriving in the apparatus, divided by the intensity of the wave(s) passed by the apparatus at the same frequency in the fiber(s) provided for guiding the wave(s). This coefficient is also usually expressed in decibels. This quality of the apparatus can be referred to as "transparency". The lower the insertion loss coefficient, the higher the transparency.

Another quality of the apparatus is passband, i.e. the width of the spectrum band that one of said waves, e.g. the carrier wave, can occupy without significantly reducing the preceding qualities.

Yet another quality of the apparatus is its power-conveying ability, i.e. the wave power that it can pass without being damaged.

Finally, another quality is the robustness of the apparatus, i.e. its reliability and its durability under severe conditions of use, e.g. in an intermediate amplifier in an under-sea transmission line.

A first prior art frequency separator-and-mixer apparatus for guided optical waves uses frequency filters and glueing between the filters and optical fibers. It is referred to as the "JDS apparatus" and is described in particular in the following article: COMPARISON OF WDM COUPLER TECHNOLOGIES FOR USE IN EDFA SYSTEMS, by A. LORD et al., Electronics letters, Jun. 21, 1990, volume 26, No. 13, p. 900 and p. 901.

The numerous experiments performed on embodiments of that apparatus show that the value of the insertion loss coefficient is typically 0.7 dB, and the value of the interport isolation coefficient is typically greater than 20 dB.

That apparatus suffers from the following drawbacks:
a high insertion loss coefficient, as indicated above;
low power-conveying ability, less than 100 mW; and
poor robustness because of the use of glue which is difficult to qualify for under-sea use.

It offers the following advantages:
a high inter-port isolation coefficient, as indicated above; and
a satisfactory passband.

A second prior art apparatus of this type, is sometimes referred to as the "Gould apparatus". It uses a coupler of the evanescent-wave type. Such a coupler is constituted by two optical fibers each of which can guide and confine one wave at the input, for example. The two fibers are welded together side-by-side over an optical interaction length L (see FIG. 1) so that the evanescent wave associated with the wave confined in each of the fibers penetrates into the other fiber. Given a coupling coefficient per unit length between the two fibers, each wave finds itself in one or other fiber at the output in a proportion defined by a sinusoidal function of the interaction length relative to the wavelength of the wave. Therefore, by an appropriate choice of interaction length, it is possible, in particular, to direct each output wave to the desired fiber, which choice constitutes the above-mentioned matching of the apparatus to the frequencies of the waves.

The second prior art apparatus and such a coupler are described in the following article:
WAVELENGTH DIVISION MULTIPLEXERS FOR EDFA, by P. A. NAGY et al., SPIE OE/FIBERS '90 vol. 1365, Components for fiber optics application V, San Jose, Calif.

The second prior art apparatus suffers from the following drawbacks:
an inter-port isolation coefficient that is insufficient for certain applications: 18 dB at the most (for the most recently measured components); and
a passband that is too narrow.

It offers the following advantages:
a better insertion loss coefficient, with a typical value being 0.2 dB;

high power-conveying ability greater than 100 mW; and good robustness because of the absence of glue, all the connections and couplings being made by welding the fibers, either end-to-end for connection purposes, or side-by-side for coupling.

A particular embodiment of the second prior art apparatus is described in the article: EFFICIENT 1.3 µm-BAND AMPLIFICATION IN A $Nd^{3+}$-DOPED SINGLE-MODE FLUORIDE FIBER, by Y. MIYAJIMA et al., ELECTRONICS LETTERS—vol. 26, No. 17, Aug. 16, 1990, STEVENAGE GB pages 1397–1398.

In that article, an evanescent-wave coupler, which can be referred to as an "directing coupler", connects a low-frequency fiber and a high-frequency fiber to an amplifying fiber. The coupler is supplemented by two other couplers of the same type which are inserted in series with the amplifying fiber for removing an interference wave generated in the fiber at a frequency that is different from said low frequency and said high frequency.

An object of the present invention is to provide frequency separator-and-mixer apparatus for guided optical waves, which apparatus makes it possible to obtain all the above-mentioned advantages, while avoiding all the above-mentioned drawbacks.

To this end, the present invention provides apparatus of this type which includes not only a frequency-selective directing coupler of the evanescent-wave type for directing said optical waves towards corresponding waveguides, but also a removal coupler of the same type inserted in series between the directing coupler and at least one of the waveguides so as to transmit a corresponding wave selectively thereto.

In FIG. 1, the first apparatus of the invention includes the following parts which are known because they are part of the above-mentioned second prior apparatus:

an optical waveguide for guiding a light wave having a frequency band and constituting a low-frequency wave, this optical waveguide constituting a low-frequency waveguide 2;

an optical waveguide for guiding a light wave which has a frequency band above the frequency band of the low-frequency wave, and which constitutes a high-frequency wave, this optical waveguide constituting a high-frequency waveguide 4, and the low-frequency waveguide and the high-frequency waveguide constituting two single-band waveguides 2, 4;

an optical waveguide for guiding said low-frequency wave and said high-frequency wave simultaneously, this optical waveguide constituting a mixed waveguide 6; and an evanescent-wave optical coupler 10 having three insertion branches 12, 14, 16 which connect it to said low-frequency waveguide 2, to said high-frequency waveguide 4, and to said mixed waveguide 6 respectively, and a fourth branch which constitutes a removal branch 18, and which does not return any light to the coupler.

The coupler constitutes a directing coupler. Its optical interaction length is chosen such that, when the low-frequency wave and the high-frequency wave propagate respectively in the low-frequency waveguide and in the high-frequency waveguide, the two waves propagate simultaneously in the mixed waveguide. In other words, the optical length is such that, as far as possible, and depending on the applications, one or other of the following two results is obtained.

In a mixer application in which the low-frequency wave and the high-frequency wave are selectively injected into the low-frequency waveguide and into the high-frequency waveguide respectively, at a distance from the coupler 10 and propagating towards it, the desired result is that the two waves are mixed in the waveguide 6, and that neither wave is sent into the branch 18. In a separator application in which the two waves propagate together in the waveguide 6 towards the coupler 10, the desired result is that the low-frequency wave is injected via the coupler 10 into waveguide 2 only, that the high-frequency wave is injected into waveguide 4 only, and that the branch 18 does not receive either wave.

In practice, a small interference fraction of each wave finds its way into each of the waveguides and each of the branches of the coupler, the interference fractions being those fractions which go into waveguides or branches other than the ones which ought to receive them, and the higher the quality of inter-port isolation and/or of transparency, the smaller the interference fractions. In order to avoid interference light being returned into the coupler from the removal branch 18, the removal branch is terminated by a sloping cleavage represented by a sloping line 19, as are all the removal branches mentioned below.

In accordance with the present invention, the apparatus includes at least one other evanescent-wave optical coupler 20. The other coupler has two insertion branches 22, 24, via which it is connected in series between the directing coupler 10 and one of said single-frequency waveguides 4 constituting an isolated waveguide. The other coupler further has two removal branches 26, 28 which do not return light towards the coupler. It constitutes a removal coupler 20 having an optical interaction length chosen so that the optical wave which is to be guided by said isolated waveguide is passed to its two insertion branches, and so that an interference component of the other optical wave is directed towards one of its removal branches.

Preferably, the optical waveguides 2, 4, 6 and the branches 12, 14, 16, 18, 22, 24, 26, 28 are optical fibers or lengths of such fibers, the evanescent-wave couplers 10, 20 each being constituted by two optical fibers welded side-by-side and of the "fused-and-drawn" type.

For example, the low-frequency waveguide 2 is a length of a line fiber of an optical-fiber transmission line. The high-frequency waveguide 4 is a pump-injection fiber fed by a local source of optical pump light constituting said high-frequency wave, and the mixed waveguide 6 is an amplifying fiber inserted in the line fiber and including a doping element that can be excited by the pump light so as to amplify said low-frequency wave.

For example, the low-frequency wave is a carrier wave occupying a spectrum band around a wavelength of 1,550 nm. The high-frequency wave has a wavelength of 980 nm or 1,480 nm, and the mixed waveguide 6 is an erbium-doped amplifying fiber.

The apparatus is made from two evanescent-wave couplers by means of a single connection weld 29.

Figure 2:
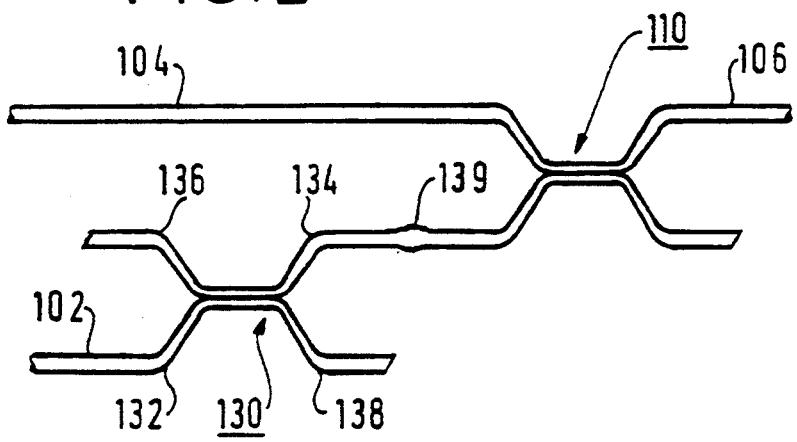
Figure 3:
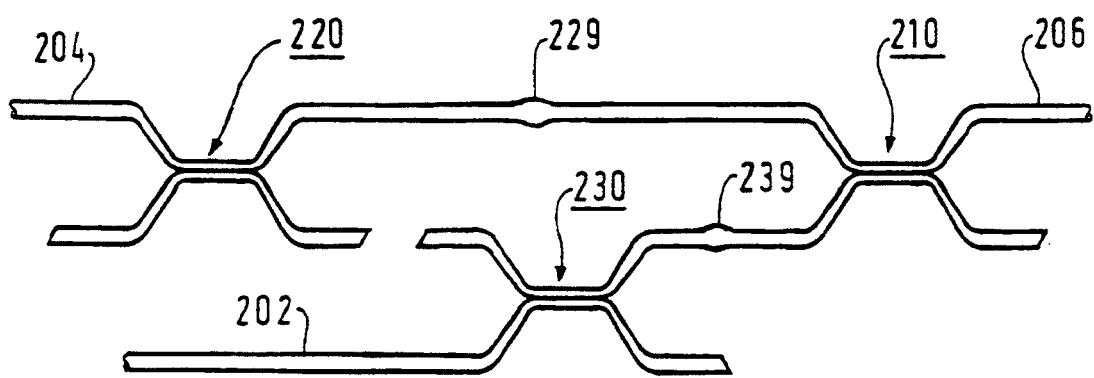

In FIGS. 2 and 3, parts which have functions and names that are analogous to the parts shown in FIG. 1 or, for FIG. 3, to the parts shown in FIG. 2, are designated by the same reference numerals each added onto a hundreds digit which is 1 for FIG. 2, and 2 for FIG. 3.

The second apparatus shown in FIG. 2 also includes a removal coupler 130 such as the one described above, and it differs from the first apparatus by the fact that the isolated waveguide is the low-frequency waveguide 102 instead of being the high-frequency waveguide 4. The parts designated by reference numerals 132, 134, 136, 138, and 139 have names and functions that are similar to those of parts 22, 24, 26, 28, and 29 respectively.

The third apparatus shown in FIG. 3 includes two removal couplers 220 and 230 so that the two single-frequency waveguides 202 and 204 constitute two isolated waveguides.

The present invention makes it possible to obtain an inter-port isolation coefficient that is not less than 25 dB between the mixed waveguide and the isolated waveguide(s). The passband measured between the same waveguides is significantly wider than the passband of the above-mentioned second prior art apparatus.

The welds such as 29, 139, 229, and 239 can be omitted when the apparatus of the invention is manufactured industrially, because the same fiber can be used to make two evanescent-wave couplers. In this way the insertion loss coefficient can be reduced.

I claim:

1. Frequency separator-and-mixer apparatus for guided optical waves, the apparatus including:

an optical waveguide for guiding an optical wave constituting a low-frequency wave, this optical waveguide constituting a low-frequency waveguide (2);

an optical waveguide for guiding an optical wave which has a frequency band above the frequency band of the low-frequency wave, and which constitutes a high-frequency wave, this optical waveguide constituting a high-frequency waveguide (4), and the low-frequency waveguide and the high-frequency waveguide constituting two single-frequency waveguides (2, 4), the optical waves constituted by at least fractions of the low-frequency wave and the high-frequency wave constituting directed waves, and their frequencies constituting two directed frequencies;

an optical waveguide for guiding said low-frequency wave and said high-frequency wave simultaneously, this optical waveguide constituting a mixed waveguide (6);

frequency-selective directing optical coupler of the evanescent-wave type (10) having three insertion branches (12, 14, 16) which connect it to said low-frequency waveguide (2), to said high-frequency waveguide (4), and to said mixed waveguide (6) respectively, and a fourth branch (18), this coupler constituting a directing coupler having an optical interaction length matched to said directed frequencies so that, when said low-frequency wave and said high-frequency wave propagate respectively in the low-frequency waveguide and in the high-frequency waveguide, the two waves propagate simultaneously in the mixed waveguide, said fourth branch of the coupler constituting a removal branch (18) which does not return any of said directed waves to the coupler; and another evanescent-wave optical coupler (20) having two insertion branches (22, 24) and two removal branches for removing an optical wave, said another evanescent-wave coupler being connected in series via said two insertion branches (22, 24) between said frequency-selective directing optical coupler and one of said single-band waveguides (4) constituting an isolated waveguide, said two removal branches (26, 28) of said another evanescent-wave coupler being organized so as not to return any of said directed waves towards said another evanescent-wave coupler, said another evanescent-wave coupler constituting a removal coupler (20) having an optical interaction length match to said directed frequencies so that that one of said low-frequency optical wave and said high-frequency optical wave which is to be guided by said isolated waveguide is passed to the two insertion branches of said another evanescent-wave coupler, and so that an interference component of the other one of said low-frequency optical wave and said high-frequency optical wave is directed towards one of the removal branches of said another evanescent-wave coupler.

2. Apparatus according to claim 1, in which said optical waveguides (2, 4, 6) and said branches (12, 14, 16, 18, 22, 24, 26, 28) are optical fibers or lengths of such fibers, said evanescent-wave couplers (10, 20) each being constituted by two optical fibers welded side-by-side and of the "fused-and-drawn" type.

3. Apparatus according to claim 1, in which said low-frequency waveguide (2) is a length of a line fiber of an optical-fiber transmission line that is provided for guiding a low-frequency wave, the low-frequency wave carrying data to be transmitted, said high-frequency waveguide (4) is a pump-injection fiber fed by a local source of optical pump light constituting said high-frequency wave, and said mixed waveguide (6) is an amplifying fiber constituting another length of line fiber and including a doping element that can be excited by the pump light so as to amplify said low-frequency wave.

* * * * *